Dec. 13, 1960 R. K. PAGE 2,964,657

ELECTRONIC COMMUTATOR

Filed June 13, 1958 4 Sheets-Sheet 1

INVENTOR.
ROBERT K. PAGE

BY Allan Rothenberg

ATTORNEY

Dec. 13, 1960 R. K. PAGE 2,964,657

ELECTRONIC COMMUTATOR

Filed June 13, 1958 4 Sheets-Sheet 2

INVENTOR.
ROBERT K. PAGE

BY Allan Rothenberg

ATTORNEY

Dec. 13, 1960 R. K. PAGE 2,964,657

ELECTRONIC COMMUTATOR

Filed June 13, 1958 4 Sheets-Sheet 3

INVENTOR.
ROBERT K. PAGE

BY Allan Rothenberg

ATTORNEY

INVENTOR
ROBERT K. PAGE
BY
Allan Rothenberg
ATTORNEY

United States Patent Office 2,964,657

Patented Dec. 13, 1960

2,964,657

ELECTRONIC COMMUTATOR

Robert K. Page, Lakewood, Calif., assignor to North American Aviation, Inc.

Filed June 13, 1958, Ser. No. 741,929

12 Claims. (Cl. 307—88.5)

Figure 1:
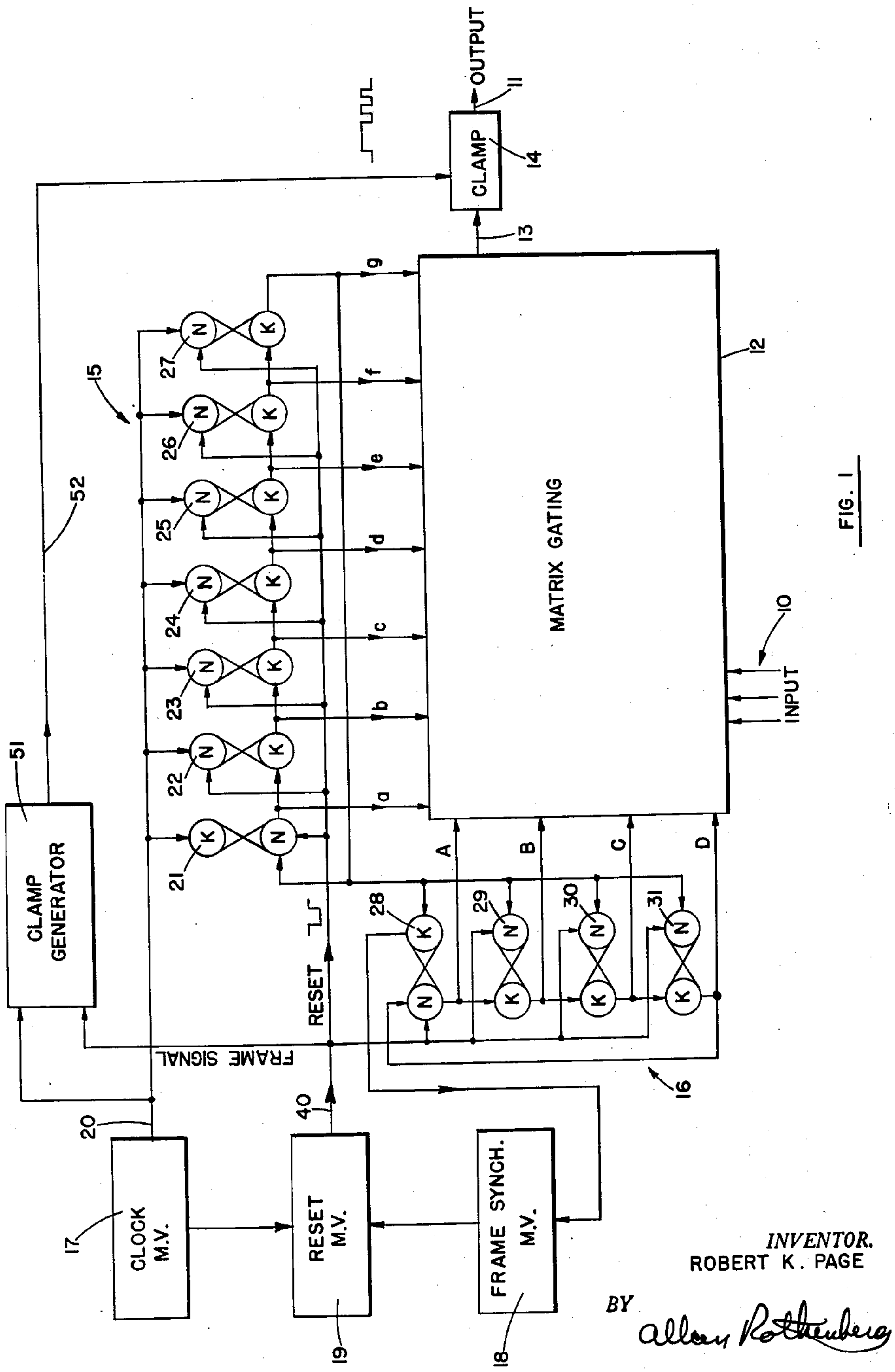

This invention relates to electronic commutators and more particularly to a novel and reliable system for sequentially transmitting and referencing a group of information signals.

There are many applications wherein the time sharing or sequential transmission of information signals is desirably employed. For example, in the testing of experimental apparatus a number of conditions must be simultaneously monitored and transmitted to a remote station for analysis. Commutation or multiplexing techniques, as is well-known, permit the handling of a greater amount of information with a minimum of equipment. For the monitoring and transmission of the conditions of interest during a test or experiment there have been and are presently utilized frequency modulation telemetering systems including a number of subcarrier oscillators which are modulated with the information to be transmitted. The information handling capabilities of such telemetering systems are markedly increased by the commutation of the input to one or more of such subcarrier oscillators. A peculiarity of one form of a presently used telemetering system is the requirement thereof of a synchronizing or frame reference pulse which has a duration several times greater than the duration of any individual information signals. Such a telemetering system further requires the clamping to a fixed reference level during a preselected period between information pulses.

Reliability of a telemetering system and its components is a primary consideration. Such systems will generally provide the major source of information concerning tests which can be performed but a single time by reason of the destructive nature of such a test. Thus, the experimental flight of an unmanned test vehicle may yield but an insignificant amount of information if its telemetering system should fail.

Accordingly, it is an object of this invention to improve the reliability of commutated information handling equipment.

In accordance with the disclosed embodiment of the invention the electronic commutator or multiplexer comprises a number of gates for sequentially transmitting a plurality of information signals and a sequential pulse generator for operating the gates individually in sequence and repetitively as a group. In order to provide the fixed reference level between information pulses, the gate outputs are clamped for a selected fractional portion of the operating time of each gate. The pulse generator includes a plurality of counters having the outputs thereof matrixed or combined to sequentially operate the gates. In order to obtain a frame reference as a unique signal occurring but once during each frame or group period, one gate is operated for a period of time distinctly different from the operating periods of all other gates.

For purposes of reliability, it is necessary that no more than one pulse exist at any one time in any counter and, furthermore, that each counter be automatically set without fail to a preselected initial condition when the commutator is turned on. For this purpose, according to the disclosed embodiment, the apparatus which stretches one count of the pulse generator and thus provides the gating pulse of unique duration is conveniently arranged to ensure the selected initial setting of the counters and to further ensure that such initial setting will positively occur once during each frame period, a complete cycle of all gates.

An object of this invention is to provide an improved electronic commutator.

A further object of the invention is the provision of a commutator having a selected duty cycle.

Another object is to provide a commutator with a fixed reference level between output pulses.

Still another object of this invention is the referencing of the signals of a repetitive group of information signals.

A further object of this invention is to ensure the automatic setting of a counter to a selected initial condition.

Still another object of the invention is to prevent two or more pulses from progressing around a counter ring.

Figure 2:
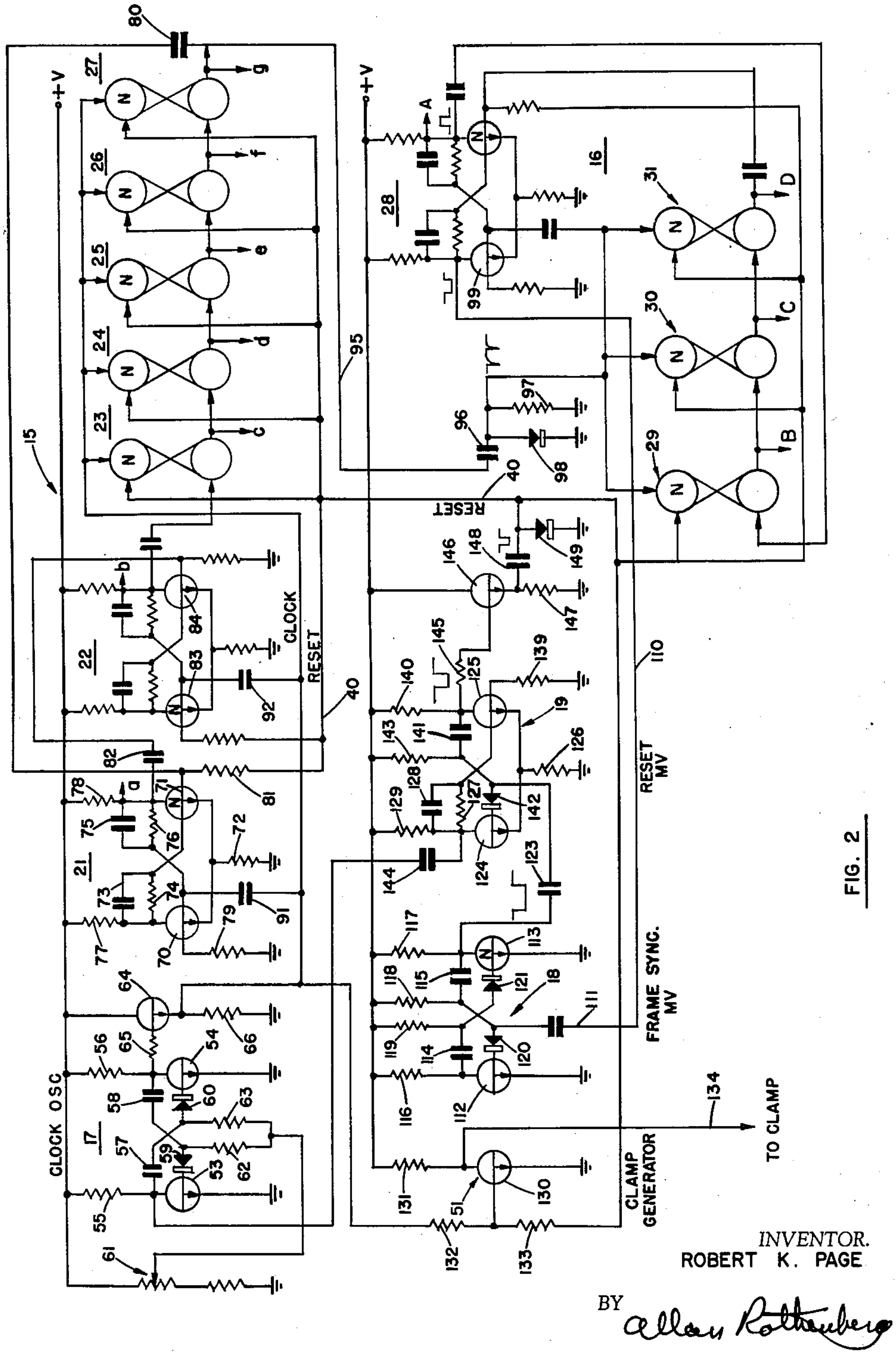
Figure 3:
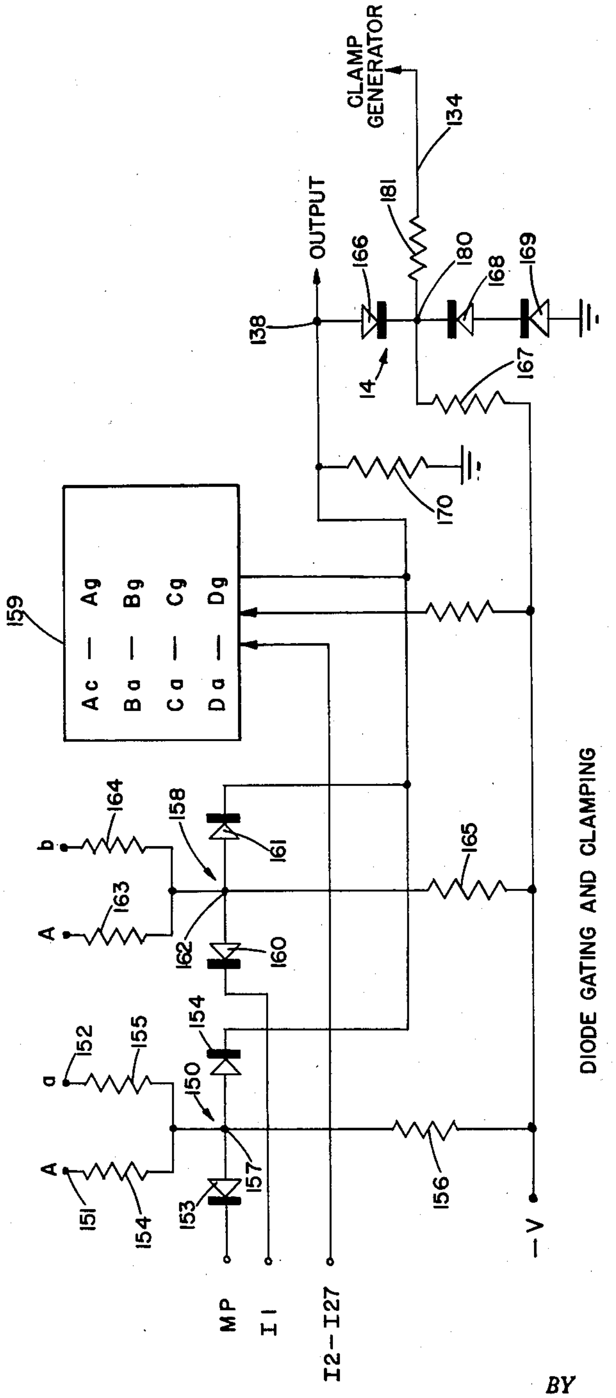
Figure 4:
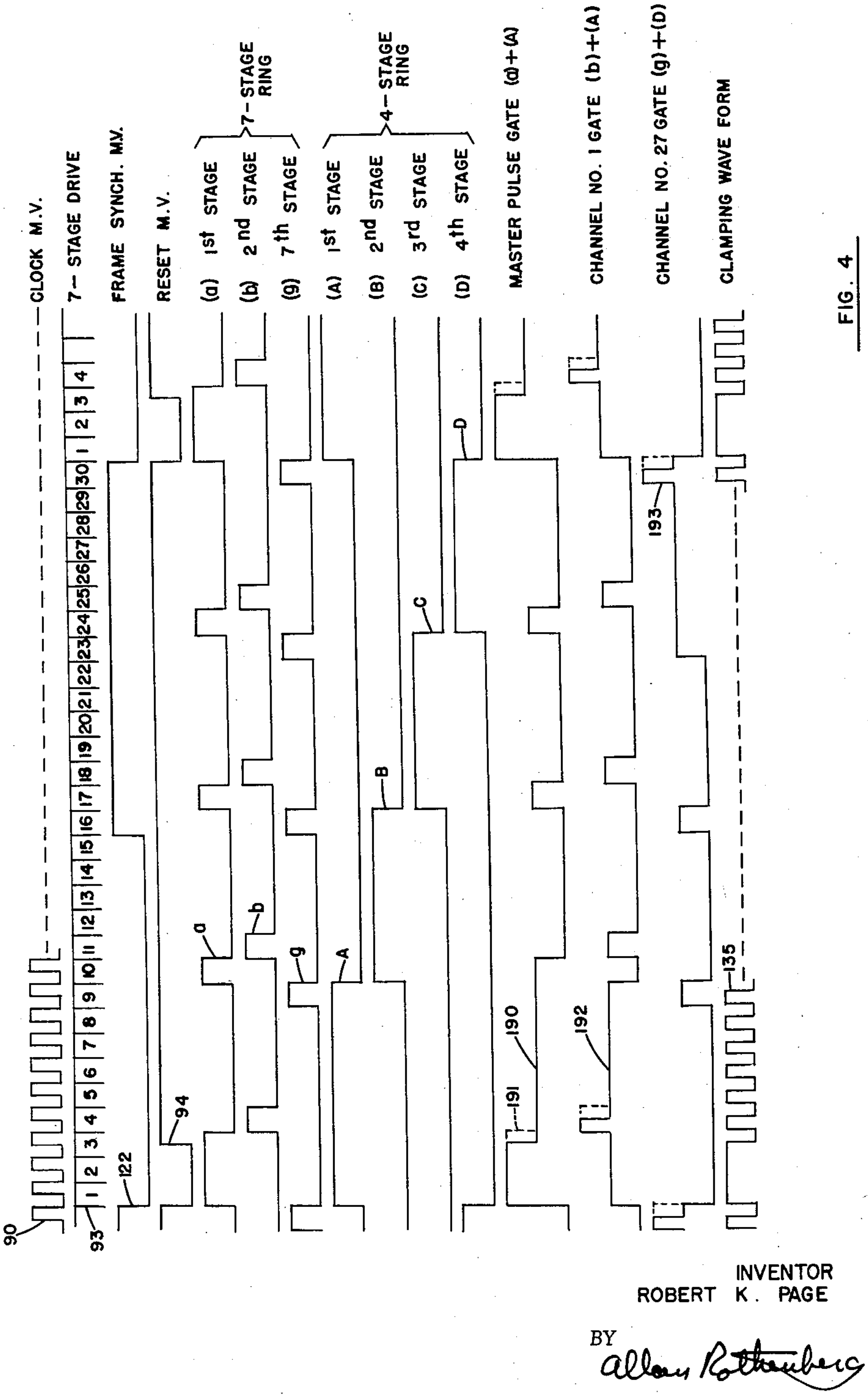

These and other objects of this invention will become apparent from the following description taken in connection with the accompanying drawings, in which Fig. 1 comprises a block diagram of a commutator according to the principles of this invention;

Fig. 2 comprises a detailed circuit diagram of the pulse generator and clamping generator of Fig. 1;

Fig. 3 illustrates the circuit details of the matrix, gating and clamp of Fig. 1;

And Fig. 4 comprises a synchro-graph of certain of the waveforms of the apparatus of Figs. 2 and 3.

In the drawings like reference numerals refer to like parts.

As illustrated in Fig. 1 the commutator of this invention is arranged to feed a plurality of input signals appearing on leads 10 in sequence and repetitively as a group to the commutator output 11. The input signals on leads 10 are applied to a matrix and gating circuit 12 having a single output lead 13 at which the input signals sequentially appear. One of the input signals on leads 10 may comprise a fixed level for setting the amplitude of a master synchronizing or reference pulse while the level of each of the other inputs will vary in accordance with the information to be transmitted. The output time multiplexed signals on lead 13 each have a duration determined by the time during which its associated gate is open or operated. These signals are fed through a clamping circuit 14 wherein the information signals are clamped to a selected level during a fractional portion, less than unity, of each individual gating period. Thus, for a 50–50 duty cycle, for example, each information pulse will be passed unchanged through the clamp for one-half of its duration while for the other half of its duration it will be held to a preselected level. The clamping action is controlled by a clamping waveform derived from output 52 of clamp generator 51.

For sequential control of the gating circuits there is provided a pulse generator which includes multi-stage ring counters 15, 16, a clock oscillator 17 and frame referencing means including a frame synchronizing oscillator 18 and reset device 19. The clock oscillator 17 provides on output lead 20 thereof a train of clock pulses which are applied to drive the ring counter 15. The counter 15 may comprise a plurality of flip-flops or bistable multivibrators 21 through 27 with the output of the last stage 27 being coupled to the input of the first stage 21 whereby the counter 15 in response to the clock pulses will repetitively provide seven successively different signals or conditions indicated as *a* through *g*. The output of stage 27 of counter 15 is applied as a driving pulse to the stages 28, 29, 30, 31 of a second multi-stage ring counter which has the output of its last stage 31 coupled to the input of its first stage 28.

In the initial condition of the counters the individual stages thereof are in the conditions indicated in Fig. 1 with the first stage of each counter "on" and all other stages "off." In the on condition of each stage one element thereof is conducting as indicated by K and the other is non-conducting as indicated by N. Thus, for example, in counter 16 with stage 28 on, the right hand element is conducting while the left hand element is non-conducting. In each of stages 29, 30 and 31 which are off in initial condition of the counter, the right hand element is non-conducting while the left hand element is conducting. The counters are illustrated in initial condition. The seven successive outputs of counter 15 are indicated by the letters *a* through *g* while the four successive outputs of counter 16 are indicated by upper case letters A through D respectively. Thus, the counter 16 will shift one step or one count for each seven steps or counts of the counter 15. The outputs *a* through *g* and A through D are matrixed in circuit 12 which uniquely combines the outputs of individually distinct pairs of counter stages to thereby provide, in the particular arrangement shown, twenty-eight different signals. These twenty-eight signals appearing in sequence in each frame period are individually applied to control twenty-eight gates in the gating circuit 12. It is to be understood that the number of stages of the counters shown is exemplary only since any number of stages may be used, depending upon the total number of information channels required.

In order to prevent two or more pulses from progressing around one or both counters at any one time, there is provided the monostable reset device 19 which provides at its output lead 40 a frame reset pulse of a natural duration just greater than a selected time such as two and one-half times the clock period. This reset pulse is applied to that element of each stage of both counters which is to be non-conducting when the counters are in the reset or initial condition illustrated in the drawing. Thus, in counter 15 for example, the reset pulse is applied to the non-conducting lower element of stage 21 and to the non-conducting upper element of stages 22–27. The reset device 19 is synchronized from the clock oscillator 17 to provide exactly the desired reset pulse duration.

Since the initial condition of the counter stages when first turned on or energized is solely a matter of chance, it is possible that all stages may initially achieve a state where none can be triggered by the driving pulses from the clock 17. For this purpose there is provided the frame synchronizing oscillator 18 which has a natural period just greater than the frame period or time required for a complete count of 28 by the pulse generator. The frame synchronizing oscillator 18 is conveniently synchronized to exactly the frame period by the output of the first stage 28 of counter 16. The output of the oscillator 18 is utilized to trigger the reset device 19 and thus positively initiate the application of the reset pulse to the counters.

The output of the clock oscillator 17 is shaped in a clamp generator 51 which thus provides a clamping pulse train on its output lead 52 comprising a series of pulses of which each has a duration substantially equal to one-half the duration of each output pulse or each count of the counter 15. In order to eliminate any clamping action during the stretched count, the initial count of longer duration, the output of reset device 19 is also applied to the clamp generator 51 to superimpose upon the clamping waveform a pulse of duration equal to the reset pulse.

It will be readily appreciated that the pulse and clamp generator comprising elements 15, 16, 17, 18, 19 and 51 may be utilized to simultaneously drive multiple gating and clamping combinations such as a number of elements 12 and 14. In such an arrangement there might be several matrix gating circuits such as circuit 12 each having its own clamp such as clamp 14 and each with its own set of input signals. Instead of requiring a pulse generator for each gating circuit the described pulse generator may be conveniently utilized to simultaneously operate multiple gating circuits and the clamps thereof.

As illustrated in Fig. 2 the clock oscillator 17 may comprise a conventional astable multivibrator comprising N.P.N. transistors 53, 54 having grounded emitters, collectors coupled to a source of positive potential +V through resistors 55 and 56 and having base-to-collector connections provided by timing capacitors 57, 58. Each base may have a diode 59, 60 connected in series therewith in order to prevent the low base to emitter breakdown voltage of the transistor from discharging the timing capacitors. A fine adjustment of frequency is obtained by a potentiometer 61 connected between the positive supply and ground and having a variable tap thereof connected to the transistor bases through timing resistors 62 and 63 respectively. A common collector output stage comprising transistor 64 has its base connected to the collector of transistor 54 through resistor 65 and has its emitter connected to ground through resistor 66. The grounded collector stage thus provides a low impedance output for the clock pulses.

Each of the stages 21–27 of counter 15 is identical to the others. Thus, two of these stages 21 and 22 are shown in detail while stages 23–27 are shown symbolically. Counter stage 21 comprises a pair of transistors 70 and 71 having the emitters thereof connected in common to a grounded resistor 72 and each having its collector coupled to the base of the other through parallel resistance capacitance networks 73, 74, 75, 76. The collectors are connected to the positive supply through resistors 77 and 78. The base of transistor 70 is connected to ground through resistor 79 while the base of transistor 71 is connected via capacitor 80 to the output of stage 27 and via resistor 81 to the reset line 40. The output of stage 21 at the collector of transistor 71 is coupled via capacitor 82 to the base of transistor 84 of the second stage 22 which includes a second transistor 83 connected in a circuit which is identical with the circuit of the first stage 21. The sole difference between stages 21 and 22 is in the connection of the reset line 40 which, in the case of stage 22, is resistance coupled to the base of a left hand transistor 83 while the base of the right hand transistor 84 is resistance coupled to ground. The output of the last stage 27 is coupled to the first stage 21 for recycling as is conventional in ring counter operation.

The square wave clock pulses 90 (Fig. 4) which appear at the emitter of transistor 64 are coupled into the left hand element of each stage by coupling capacitors 91, 92 and similar capacitors (not shown) for the other stages. Since the clock pulses from the clock oscillator are actually rounded off to some extent on the leading edge thereof, the capacitors 91 and 92, together with the load provided by the counter differentiate the trailing edge of the pulses 90 to provide the sharp negative driving pulses 93. These negative pulses will cut off a conducting transistor but have no effect upon a non-conducting transistor. In the reset or initial condition the left hand element 70 of stage 21 is conducting whereas the left hand element of each of stages 22–27 are non-conducting. In such a condition a negative driving pulse will turn stage 21 off to provide, via capacitor 82, a negative pulse to the base of transistor 84 of stage 22 to cause transistor 84 to be non-conducting and to cause transistor 83 to conduct and thereby place stage 22 in the on condition. This operation is repeated for each clock pulse with successive stages being turned on, consecutively, and the cycle repeating itself to provide the usual ring counter operation. It is to be noted, however, that the driving pulses from the clock oscillator can not shift the condition of any of the stages of counter 15 during the presence of the negative reset pulse 94 which appears on the reset line 40. The outputs *a* through *g* appear as indicated on the collectors of the right hand transistors of each stage.

The four-stage counter 16 is identical, except for the number of stages, to the seven-stage counter 15 and no detailed description thereof is believed to be necessary.

The output of stage 27 of counter 15 is applied via lead 95 to a differentiator including capacitor 96 and resistor 97 to the input of each of the left hand elements of stages 28–31 of the counter 16. Positive pulses from differentiator 96, 97 may be clamped by diode 98. With the counter 16 driven by every seventh pulse *g* of counter 15 the outputs A, B, C and D will occur in sequence as indicated in Fig. 4. At the collector of the left hand element 99 of the first stage 28 of the four-stage counter appears a negative going pulse 180° out of phase with the output pulse A and which is applied via lead 110 and coupling capacitor 111 as a synchronizing input to the frame synchronizing oscillator or multivibrator 18.

Multivibrator 18 is a conventional free-running multivibrator comprising grounded emitter transistors 112 and 113 having timing capacitors 114 and 115 interconnecting the collector of each to the base of the other, and having the bases returned to a positive source of potential +V via timing resistors 118 and 119. The collectors are returned to the same source of potential through resistors 116 and 117. As in the oscillator 17, diodes 120 and 121 are series connected with each base. The frame synchronizing oscillator 18 thus provides at the collector of transistor 113 a negative going waveform 122 (Fig. 4) which is applied via capacitor 123 to the reset device 19.

The reset device 19 comprises a monostable multivibrator including transistors 124, 125 having the emitters thereof connected together and connected through resistor 126 to ground. The collector of transistor 124 is connected to the base of transistor 125 by parallel resistance capacitance network 127, 128 and connected to the positive supply through resistor 129. The collector of transistor 125 is connected to the positive supply through resistor 140 and to the base of transistor 124 through capacitor 141 and diode 142 while its base is grounded through resistor 139. Timing capacitor 141 is returned to the positive supply through timing resistor 143.

In stable condition transistor 124 is conducting whereby the negative going edge of the output 122 of frame synchronizing multivibrator 18 will cut off this transistor and cause transistor 125 to conduct for a period determined by the time constant of the monostable multivibrator 19. In order to exactly control the width of the negative reset pulse 94 which appears at the collector of transistor 125 to be exactly two and one-half times the clock period, a negative going synchronizing pulse is obtained from transistor 53 of the clock oscillator through coupling capacitor 144 and applied to the collector of transistor 124 and the base of transistor 125. Thus, the time at which the monostable device returns to its stable condition, is exactly synchronized with the clock.

The negative going reset pulse 94 is coupled through resistor 145 to the base of a common collector stage comprising transistor 146 having its collector returned to positive supply and its emitter connected to ground through resistor 147. Thus, the reset pulse 94 is coupled to reset line 40 from a low impedance output through a relatively large capacitor 148 and clipping diode 149. If the pulse generator circuit is operating normally this reset pulse will merely stretch the first count thereof by holding all stages in the initial condition for the duration of the reset pulse. The initial driving pulse from the clock oscillator 17 immediately following the trailing positive going edge of reset pulse 94 triggers the seven-stage counter ring 15 to its next state or count. If the pulse generator is not operating normally and has two or more pulses therein or if, at this time, one or both of the first stages of the respective counters is off or one or more of the other stages are on, this reset pulse 94 will positively reset all of the stages of both counters to the proper condition.

It will be seen that the pulse generator which is adapted to be driven solely by the negative going pulses 93 might possibly, when initially turned on, obtain a condition wherein no stage of one or both counters would be responsive to the negative driving pulse. Generally, counters of this type must be initially set by hand or mechanical means for this reason. The provision of the frame synchronizing oscillator 18, however, positively ensures a trigger to the reset device 19 to thereby ensure the proper initial setting of the counters automatically.

As illustrated in Fig. 3 positive gating pulses for operating the several gates are obtained by combining unique pairs of outputs, one from counter 15 and one from counter 16. The gating or gate controlling pulse for the master synchronizing or frame reference pulse is taken from the first stage of both rings since it is the first stages 21 and 28 that are held in the on condition by the reset pulse 94 for the uniquely lengthened period. Thus, for the gate 150 of the master pulse, the gate inputs at control terminals 151 and 152 thereof are obtained as the pulses A and *a* from stages 28 and 21 of Fig. 2. All of the gates are identical with gate 150 which comprises, for example, a pair of back to back diodes 153, 154 having the anodes thereof connected together and to the control terminals 151 and 152 through resistors 154 and 155 respectively. The common anode connection 157 is coupled with a source of negative voltage −V through resistor 156. The cathode of diode 153, the gate input, is connected to the source of signal to be multiplexed while the cathode of diode 154 is connected to the commutator output terminal 138 which is grounded through resistor 170. In the case of the master gate 150 the input MP thereto is most conveniently a fixed level signal.

With the input circuit open the voltage at point 157, the junction of the diodes 153 and 154, will be at a voltage such as −10 volts when both of stages 21 and 28 are off (the absence of positive signals *a* and A). When only one of stages 21 and 28 is off, junction 157 will be at a higher though still negative voltage such as −1 volt. In either case with the input circuit open diodes 153 and 154 are cut off for positive input signals appearing at the cathode of diode 153. When both stages 21 and 28 are on, however, the voltage at junction 157 is positive, on the order of +5 volts, with the input circuit open. Therefore, when a positive input of a magnitude of, for example, between 0 and 3 volts is applied to the gate input the voltage at junction 157 is clamped to the input voltage level (assuming a low impedance source) with the addition of a small voltage drop across the diode 153. In this situation both diodes 153 and 154 will conduct and the output at terminal 138 is thus proportional to the input at the cathode of diode 153 over the assumed input range.

In the arrangement shown, the input MP to diode gate 150 is not a variable since this is the master or frame reference signal which is to be transmitted for the uniquely longer period by virtue of the stretched initial count of the counters. The diode gating circuitry includes for the twenty-seven channel commutator shown, twenty-seven gates each identical with the gate 150. Only the first information channel gate 158 is shown in detail while the other twenty-six information channel gates are symbolically shown by the box 159. It is to be understood that the box 159 includes gates having gating control signals coupled to unique pairs of counter stage outputs A*c*—A*g*, B*a*—B*g*, C*a*—C*g* and D*a*—D*g* and each having an information signal input I2—I27 respectively proportional to the information to be commutated and transmitted. For example, the diode gate 158 includes diodes 160 and 161 connected in common to junction 162 and through resistors 163 and 164 to the outputs A and b of stages 28 and 22 respectively. The cathode of diode 160 is adapted to receive the information signal I1 whose magnitude will vary in accordance with the information to be transmitted. Junction 162 is connected to the negative supply through resistor 165 which is analogous to resistor 156.

The output at terminal 138 is clamped by clamp 14 under control of a signal from the clamp generator 51. As illustrated in Fig. 2, clamp generator 51 comprises a grounded emitter transistor 130 having the collector thereof connected to the positive supply through resistor 131 and its base connected to the emitter of transistor 64 through resistor 132 to receive the clock pulses 90 therefrom to cause transistor 130 to conduct and drive its output, at its collector, substantially to ground. The clamp generator 51 acts to clamp the gate output solely when the clamping waveform is relatively negative. No clamping action is desired during the uniquely lengthened frame reference period. Therefore, the negative going reset pulse 94 from the reset line 40 is applied via resistor 133 as a second input to the base of the clamping generator transistor 130. This negative going reset pulse during the frame reference period cuts off transistor 130 to maintain the clamping waveform relatively positive during this time.

For the specified 50–50 duty cycle of the output pulse train at output terminal 138 (Fig. 3), it is necessary to clamp this terminal to a fixed reference for half of each sample or information gating period. The clamping waveform from the clamp generator 51 is essentially the output of the clock multivibrator 17 which has been squared up by the transistor 130. The clamping action, however, is eliminated during the reference or initial master pulse period by superimposing upon the clamping waveform the negative reset pulse 94 which holds the clamp generator 51 cut off. The output of the clamping generator on lead 134 thereof therefore comprises a train 135 (Fig. 4) of positive square waves with every 28th pulse having a duration five times the duration of the other pulses thereof and each such other pulse having a duration of one-half the clock period.

As indicated in Fig. 4, the duration of the relatively positive portion of the clamping waveform 135 occurs during the first half of the gating period. The termination of the gating period is indicated in Fig. 4 by the dotted lines for the master pulse gate and the first and last information channel gates.

The clamp 14 (Fig. 3) comprises a diode 166 having its anode connected to output terminal 138 and its cathode connected through resistor 167 to the negative supply −V. A pair of similarly poled series connected diodes 168 and 169 are connected between ground and the cathode of diode 166 at junction 180 which is connected through resistor 181 to the output lead 134 of the clamp generator upon which appears the clamping waveform 135. The waveform 135 may vary, for example, between +8 volts when relatively positive and approximately zero when relatively negative. During the first half of each gating pulse the relatively positive clamping waveform holds the junctions 180 at a relatively positive voltage sufficient to hold diode 166 cut off. During the second half of each gating pulse period (other than the master pulse period), the clamping voltage is substantially at ground and the voltage at junction 180 is at this time determined by the drop across the forwardly conducting diodes 168 and 169. This voltage drop which may be on the order of −1.2 volts will produce at output terminal 138 a voltage on the order of −0.5 volt due to the drop across diode 166. Thus, during the second half of the gating pulse period the voltage at output terminal 138 is clamped to a reference level determined by the clamping circuit and the voltage at the diode gating junctions, such as junctions 157 and 162, is zero (due to the drop across the diodes such as diode 154 of the gates). Thus, the input diode such as 153 or 160 of each gate is cut off for positive input signals.

When the clamping waveform is relatively positive and diode 166 is cut off the clamp is disabled and the gated output appears at terminal 138.

Since the master or frame reference pulse is obtained by applying a fixed input MP of 3 volts, for example, to the input of gate 150 it is desirable to eliminate the clamping action during the period of operation of this gate. As will be seen from Fig. 4, the clamping waveform 135 remains positive for substantially the entire period of operation of the gate 150 which occurs during coincidence of signals A and a. Thus, there is provided a fixed level master pulse which is five times as wide as the information pulses.

As illustrated in Fig. 4, the master pulse gating signal appearing at terminal junction 157 is designated by the numeral 190 and comprises the superposition of the stretched pulse a upon the pulse A. The dotted line 191 indicates the duration of this gating pulse as it would be if the junction 157 were not affected by the immediately succeeding clamping interval. However, at the trailing or positive going edge of reset pulse 94 the clamping waveform drops and clamping action is initiated to drop the voltage level at junction 157 prior to the termination of the stretched pulse a.

The waveform 192 which appears at the junction 162 of diode gate 158 and the waveform 193 appearing at the corresponding junction of the 28th gate (which receives input I27) are also illustrated in Fig. 4 as comprising the superposition of pulse b upon pulse A and pulse g upon D respectively. These combined waveforms are also affected by the clamping waveform in a manner similar to that of the master pulse gate 190 as indicated by the dotted lines.

By way of illustration, the following table lists the component values of an exemplary embodiment of the disclosed invention.

| Part | | Value |
|---|---|---|
| 55, 56 | kilohms | 24 |
| 57, 58 | microfarads | 0.01 |
| 61 | kilohms | 5 |
| 62, 63 | do | 430 |
| 65 | do | 36 |
| 66 | do | 20 |
| 72 | do | 470 |
| 73, 75 | microfarads | 270 |
| 74, 76 | kilohms | 180 |
| 77, 78 | do | 16 |
| 79 | do | 20 |
| 80 | microfarads | 150 |
| 81 | kilohms | 20 |
| 82 | microfarads | 150 |
| 91 | do | 47 |
| 92 | do | 47 |
| 96 | do | 470 |
| 97 | kilohms | 510 |
| 111 | microfarads | 100 |
| 114, 115 | do | 0.33 |
| 116, 117 | kilohms | 24 |
| 118, 119 | do | 430 |
| 123 | microfarads | 150 |
| 126 | ohms | 620 |
| 127 | kilohms | 240 |
| 128 | microfarads | 270 |
| 129, 140 | kilohms | 22 |
| 131 | do | 51 |
| 132 | do | 300 |
| 133 | do | 39 |
| 139 | do | 24 |
| 141 | microfarads | .068 |
| 143 | kilohms | 270 |
| 144 | microfarads | 10 |

| Part | | Value |
|---|---|---|
| 145 | kilohms | 100 |
| 147 | do | 5.1 |
| 148 | microfarads | 3.5 |
| 154, 155, 163, 164 | kilohms | 510 |
| 156, 165 | do | 560 |
| 167 | do | 220 |
| 170 | do | 240 |
| 181 | do | 82 |

+V 36 volts positive.
—V 36 volts negative.
All transistors are Texas Instrument Co. type 909.
All diodes are Hughes Aircraft Co. type H–D 6005.

It is to be noted that the gating arrangement illustrated in Fig. 3 inherently provides highly desirable signal limiting and at the same time substantially eliminates cross-talk between channels. In its limiting operation each gate such as gate 150 or gate 158 will be cut off for negative inputs and also for all positive inputs above a value of approximately 4.5 volts positive for exemplary values of disclosed components. For example, a negative input at I1 will provide a negative voltage at point 162 to thereby maintain diode 161 cutoff. Furthermore, a positive voltage in excess of 4.5 volts at input I1 will raise the cathode of diode 160 above the +5 volt level of point 162 (the diode anode) during the gating period of gate 158. Thus, for signals above +4.5 volts diode 160 is cut off whereby, in the exemplary arrangement shown, the output at point 138 is limited to a range between 0 and 5 volts.

The back-to-back diode arrangement also provides at all times a high impedance between any non-gated signal input and the gated output at point 138. Thus, all non-gated inputs will have no effect upon the gated output and cross-talk is eliminated.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electronic commutator comprising clamping means, a plurality of gates for passing a plurality of input signals to said clamping means, cyclic timing means for cylically operating each said gate for like predetermined periods in predetermined sequence, means synchronized from said timing means for repetitively generating at the cyclic rate thereof a frame reset signal having a duration distinct from the duration of each said predetermined period, said timing means including means responsive to said frame signal for operating one of said gates for the duration of said frame signal, and a clamping generator responsive to said frame signal and timing means for repetitively disabling said clamping means during each cycle of said timing means for the duration of said frame signal and for successive periods each less than the period of a corresponding one of said predetermined periods of gate operation.

2. An electronic commutator comprising signal clamping means, multiplexing means for successively coupling to said clamping means the signals of a group of input signals at a cyclical group repetition rate, frame reference means synchronously coupled with said multiplexing means for effecting the coupling of one of said signals to said clamping means for a time distinctly greater than the coupling time of another of said input signals, and means responsive to said frame reference and multiplexing means for disabling said clamping means during said greater time and during a time less than the coupling time of said other signal.

3. A commutator comprising an output channel and a plurality of input channels, means for sequentially coupling signals in said input channels to said output channel for time intervals which are substantially equal for all but one of said signals and for a greater time interval for said one signal, and means synchronized with said sequential coupling means for clamping the signal appearing in said output channel to a predetermined level during a portion of each said substantially equal interval.

4. A commutator comprising an output channel and a plurality of input channels; means for sequentially coupling signals in said input channels to said output channel for time intervals which are substantially equal for all but one of said signals and for a greater time interval for said one signal, said sequential coupling means including a plurality of gates respectively connected between said input channels and said output channel and cyclic counter means for repetitively generating a group of pulses including a plurality of pulses each having a period equal to said equal intervals and a unique reference pulse having a period equal to said greater interval, and means for operating said gates to response to respective ones of said pulses; and means synchronized with said sequential coupling means for clamping during a portion of each said substantially equal interval the signal appearing in said output channel.

5. An electronic commutator comprising first and second multi-stage ring counters, a pulse generator connected to drive said first counter, means responsive to a predetermined stage of said first counter for driving said second counter, a plurality of gates each adapted to receive and transmit an input signal, means for enabling each said gate in response to a unique pair of counter stages, means for clamping signals transmitted by said enabled gates, a clamp generator synchronized with said pulse generator for repetitively disabling said clamping means, and a frame reference generator synchronously coupled with one of said counter stages for stretching the duration of a predetermined count of said first counter and controlling said clamp generator to disable said clamp for the duration of said stretched count.

6. A sequential pulse generator comprising first and second multi-stage ring counters, a clock pulse generator connected to drive said first counter, means responsive to a selected stage of said first counter for driving said second counter, and a reset device responsive to one of said counters for periodically turning on one stage of each counter and simultaneously turning off all other stages.

7. A sequential pulse generator comprising first and second multi-stage ring counters, a clock pulse generator connected to drive said first counter, means responsive to a selected stage of said first counter for driving said second counter, and a reset device responsive to one of said counters for periodically turning on one stage of each counter and simultaneously turning off all other stages, said reset device comprising a monostable multivibrator having an input connected with a stage of said second counter and an output connected with each counter stage.

8. A sequential pulse generator comprising multi-stage ring counter means for generating a selected number of pulses within a frame period, clock generator means for driving said counter means, an oscillator, and means responsive to said oscillator for setting the stages of said counter means in predetermined conditions once during each frame period, said last mentioned means comprising frame reference means for maintaining said predetermined conditions of said stages for a time distinctly greater than the duration of the pulses generated by said counter means.

9. A sequential pulse generator comprising multi-stage ring counter means for generating a selected number of pulses within a frame period, clock generator means for driving said counter means, an oscillator having a natural period greater than said frame period, means responsive to said counter means for synchronizing said oscillator period to said frame period, and means responsive to said oscillator for setting the stages of said counter means in predetermined conditions once during each frame period, said last mentioned means comprising frame reference means for maintaining said predetermined conditions of said stages for a time distinctly greater than the duration of the pulses generated by said counter means.

10. A commutator comprising first and second multistage ring counters, a clock multivibrator for generating at first and second terminals thereof first and second opposite phase clock output pulse trains, means for coupling said first clock pulse train to the stages of said first counter, means for coupling a stage of said first counter to the stages of said second counter, a plurality of gates each having a pair of gating terminals respectively coupled to the stages of a unique pair of counter stages, each said pair of stages comprising one stage of said first counter and one stage of said second counter, whereby each of said gates is repetitively operated at a frame repetition rate and in sequence once during each frame period, each gate having an individual input terminal and all gates having a common output terminal, an oscillator having a natural period not less than said frame period, a synchronizing connection to said oscillator from a stage of said second counter, a monostable device for generating at an output terminal thereof a reset pulse having a duration distinctly greater than the time between successive pulses of said clock pulse trains, a triggering connection from said oscillator to said monostable device, a reset connection between said second terminal of said clock multivibrator and said monostable device, and means for coupling said reset pulse to said counters.

11. A commutator comprising first and second multistage ring counters, a clock multivibrator for generating at first and second terminals thereof first and second opposite phase clock output pulse trains, means for coupling said first clock pulse train to the stages of said first counter, means for coupling a stage of said first counter to the stages of said second counter, a plurality of gates each having a pair of gating terminals respectively coupled to the stages of a unique pair of counter stages, each said pair of stages comprising one stage of said first counter and one stage of said second counter, whereby each of said gates is repetitively operated at a frame repetition rate and in sequence once during each frame period, each gate having an individual input terminal and all gates having a common output terminal, an oscillator having a natural period not less than said frame period, a synchronizing connection to said oscillator from a stage of said second counter, a monostable device for generating at an output terminal thereof a reset pulse having a duration distinctly greater than the time between successive pulses of said clock pulse trains, a triggering connection from said oscillator to said monostable device, a reset connection between said second terminal of said clock multivibrator and said monostable device, means for coupling said reset pulse to said counters, a clamping diode connected with said common output terminal and having a control terminal, a clamp generator having an output coupled with said clamping diode control terminal and having a pair of input terminals, said clamp generator input terminals being respectively coupled with said first terminal of said clock multivibrator and said output terminal of said monostable device.

12. A commutator comprising counter means for cyclically generating at a group repetition rate a group of successive gating pulses of predetermined duration, gating means connected with said counter means to be controlled by said gating pulses for sequentially transmitting a plurality of input signals applied thereto, frame reference means synchronized from said counter means for distinctly increasing the duration of one pulse of each group, means for clamping the signals transmitted by said gating means, and means responsive to said counter means and said frame reference means for disabling said clamping means for substantially all of the duration of said one pulse and for fractional portions less than unity of the other pulses of each group.

References Cited in the file of this patent

UNITED STATES PATENTS

| | | |
|---|---|---|
| 2,404,918 | Overbeek | July 30, 1946 |
| 2,465,355 | Cook | Mar. 29, 1949 |
| 2,627,039 | Mac Williams | Jan. 27, 1953 |
| 2,766,379 | Pugsley | Oct. 9, 1956 |
| 2,825,889 | Henle | Mar. 4, 1958 |
| 2,833,920 | Buley | May 6, 1958 |
| 2,844,811 | Burkhart | July 22, 1958 |